[54] METHOD OF ADJUSTING A LUNEBURG LENS

[75] Inventors: Carl M. Verber, Columbus; Van E. Wood, Delaware, both of Ohio

[73] Assignee: Canon Kabushiki Kaisha, Tokyo, Japan

[21] Appl. No.: 254,465

[22] Filed: Apr. 15, 1981

[51] Int. Cl.$^3$ ............................ B05D 3/06; G02B 3/00
[52] U.S. Cl. ...................................... 427/8; 427/53.1; 427/54.1; 427/55
[58] Field of Search .................... 427/8, 53.1, 54.1, 55

[56] References Cited

PUBLICATIONS

S. K. Yao, Theoretical Model of Thin-Film Deposition Profile with Shadow Effect, J. App. Phys., 50, 3390 (May 1979).
S. K. Yao and D. B. Anderson, Shadow Sputtering Diffraction-Limited Waveguide Luneburg Lenses, App. Phys. Lett. 33, 307 (Aug. 1978).
S. A. Keneman, et al., Evaporated Films of Arsenic Trisulfide: Dependence of Optical Properties on Light Exposure and Heat Cycling, J. Opt. Soc. Am., 68, 32 (Jan. 1978).
J. S. Berkes, et al., Photodecomposition of Amorphous $As_2Se_3$ and $As_2S_3$, J. Appl. Phys., 42, 4908 (Nov. 1971).
R. G. Brandes, et al., Optically Formed Dielectric Gratings in Thick Films of Arsenic-Sulfur Glass, Applied Optics, 9, 1712 (Jul. 1970).
Y. Ohmachi and T. Igo, Laser-Induced Refractive-Index Change in As-S-Ge Glasses, App. Phys. Letter., 20, 506 (Jun. 1972).
S. K. Yao, et al., Guided-Wave Optical Thin-Film Luneburg Lenses: Fabrication Technique and Properties, Appl. Optics, 18, 4067 (1979).

Primary Examiner—James R. Hoffman
Attorney, Agent, or Firm—Fitzpatrick, Cella, Harper & Scinto

[57] ABSTRACT

A method for forming a Luneburg lens having a predetermined focal length on an optical waveguide includes fabricating the lens on a waveguide from a photorefractive material and then exposing the lens to energy radiation, particularly ultra violet light, to thereby adjust the refractive index until the predetermined focal length is established.

5 Claims, 2 Drawing Figures

METHOD OF ADJUSTING A LUNEBURG LENS

BACKGROUND OF THE INVENTION

1. Field of the Invention

The present invention relates to Luneburg lenses and more particularly it concerns a method of forming a Luneburg lens having an adjusted focal length.

2. Description of the Prior Art

Integrated optics is an attractive approach for providing new devices for signal processing such as scanners, deflectors, modulators, switches, RF spectrum analyzers, convolvers, correlators, multiplexers and demultiplexers, because of the potential for very high performance operation and high speed processing using optical processing principles in a structure that can be very small and rigid in its planar configuration, and which can be manufactured by batch fabrication techniques.

Such devices require thin-film waveguide lenses to control the shape of the guided beam for imaging, spatial filtering, focusing and Fourier analysis. The lenses for these applications must have high efficiency, high performance and high stability. Further, accuracy, meaning that the focal length of the lens shape is accurate enough to satisfy design specifications, is essential for more precise applications such as where a well-collimated guided beam or a sufficiently small beam spot size are needed.

One typical class of integrated optical lenses often considered for such use is the Luneburg lens. The Luneburg lens is one of the classical index-graded lenses and has a circularly symmetric refractive index distribution that perfectly focuses the arc of a fixed circle onto the arc of a second fixed circle. Such Luneburg lenses are fabricated by sputtering or evaporating the lens material onto a waveguide surface through a circular mask with shaped edges. S. K. Yao, et al., *Guided-Wave Optical Thin-Film Luneburg Lenses: Fabrication Technique and Properties*, Appl. Optics, 18, 4067 (1979).

However, a fabricated Luneburg lens often has a different focal length from the design value because of, for example, misalignment between mask and substrate positions or slightly different refractive indices caused by accidental error of the deposition condition.

These problems are usually very difficult to correct in the fabrication process, even when extreme care is taken. Therefore there is a need to somehow adjust the focal length of a fabricated Luneburg lens to correct for any error in the fabricated system. Otherwise the overall cost of fabrication of such devices becomes extremely expensive.

SUMMARY OF THE INVENTION

The present invention avoids the disadvantages of the prior art by means of a novel method for forming a Luneburg lens having an adjusted focal length by exposing the fabricated lens to energy radiation.

According to one aspect of the invention there is provided a method for forming a Luneburg lens having a predetermined focal length by fabricating a Luneburg lens overlay on a waveguide and then exposing the Luneburg lens to energy radiation until the focal length is adjusted to the predetermined value. The Luneburg lens may then be covered with a protective coating to prevent further variation of the focal length.

We have also found that $As_2S_3$ is especially suitable as a material for evaporation to form a thin film Luneburg lens on a waveguide of high efficiency and high performance, which waveguide is formed by thermal diffusion of Ti film deposited on a ferroelectric crystal substrate of $LiNbO_3$. A Ti in-diffused $LiNbO_3$ waveguide has a low-loss light propagation characteristic ($\sim 1$ dB/cm) and a high acousto-optical figure of merit. Moreover, the refractive indices of $As_2S_3$ and a Ti in-diffused $LiNbO_3$ waveguide are approximately 2.37 and 2.27, respectively, at $TM_0$ mode for a laser diode having a wavelength of 0.8300 microns in air and approximately 2.39 and 2.29, respectively, for an He-Ne laser having a wavelength of 0.6328 microns in air. Therefore, an $As_2S_3$ Luneburg lens will serve as an efficient focusing or collimating lens for such wavelength light propagating within a waveguide of Ti in-diffused $LiNbO_3$.

Thus, this combination of a thin-film $As_2S_3$ Luneburg lens on a Ti in-diffused $LiNbO_3$ waveguide is particularly suitable for a device such as an RF spectrum analyzer or beam scanning module because of the low-loss light propagation characteristics and high acousto-optical figure of merit of the waveguide and the large lens power of the $As_2S_3$ Luneburg lens caused by the large difference of refractive indices between the waveguide and the lens.

According to another aspect of the present invention there is provided a method of forming a Luneburg lens having a predetermined focal length by fabricating the Luneburg lens from $As_2S_3$ on a waveguide and then exposing the Luneburg lens to energy radiation until the focal length is adjusted to the predetermined value. The waveguide may be Ti in-diffused $LiNbO_3$.

There has thus been outlined the more important features of the invention in order that the detailed description thereof that follows may be better understood and in order that the present contribution to the art may be better appreciated. There are, of course, additional features of the invention which will be described hereinafter and which will form the subject of the claims appended hereto. Those skilled in the art will appreciate that this invention may be utilized as a basis for performing other methods for carrying out the several purposes of the invention. It is therefore important that the claims be regarded as including such equivalent methods as do not depart from the scope of the invention.

BRIEF DESCRIPTION OF THE DRAWINGS

Several embodiments of the invention have been chosen for purposes of illustration and description and are shown in the accompanying drawings forming a part of the specification, wherein.

DETAILED DESCRIPTION OF THE PREFERRED EMBODIMENTS

Figure 1:
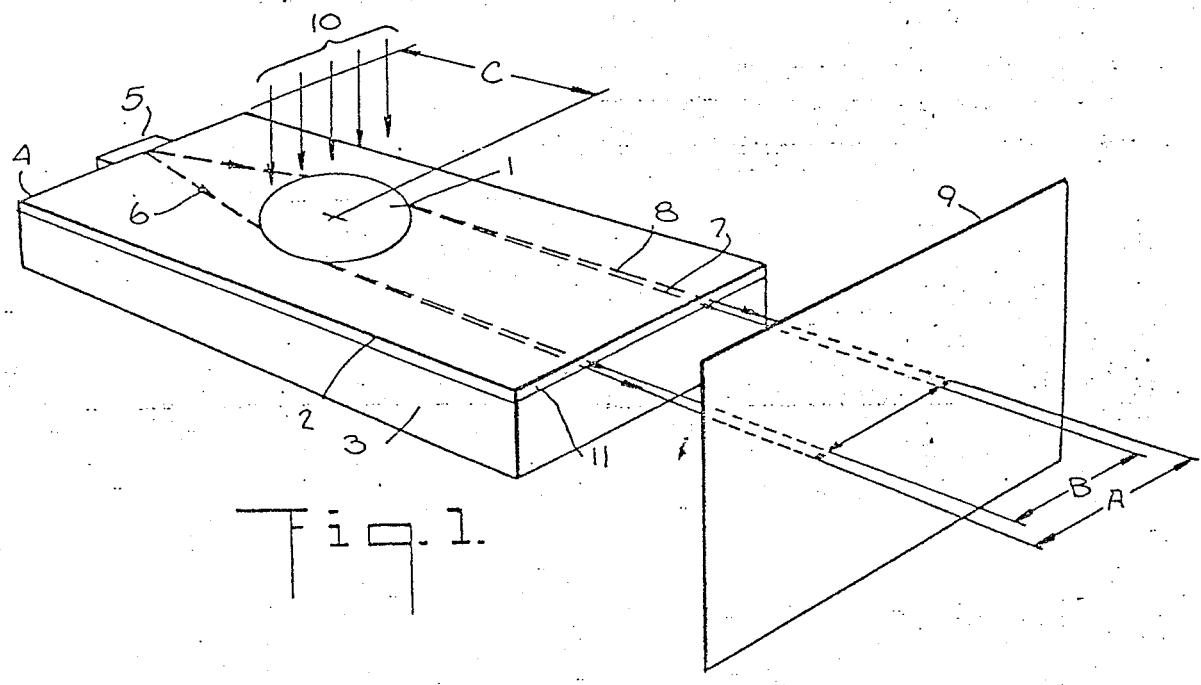
FIG. 1 is a perspective view illustrating an $As_2S_3$ Luneburg lens according to the present invention used as a collimating lens.

FIG. 1 shows a Luneburg lens 1 of $As_2S_3$ formed by mask deposition on a waveguide 2 of a material having a lower refractive index than that of $As_2S_3$. The waveguide 2 is on a substrate 3, which may be Y-cut $LiNbO_3$ or other material. The waveguide 2 has a slightly higher refractive index than that of substrate 3 to satisfy the light propagation conditions in the waveguide.

It will be appreciated that while a Luneburg lens formed by evaporating $As_2S_3$ will include primarily $As_2S_3$, the as-deposited lens may also include some arsenic-sulfur compounds of different proportions.

In the first step, that is, in the actual fabrication process of the Luneburg lens, the distance "C" between the center of the $As_2S_3$ Luneburg lens 1 and the waveguide end face 4 where a divergent beam 6 emitted from a laser diode 5 is to be butt-coupled, is set at the designed focal length for the $As_2S_3$ Luneburg lens 1. However, because the as-deposited lens has an index of refraction less than the design index, it has a focal length greater than the design focal length. Therefore, in the as-deposited Luneburg lens, the propagating divergent beam 6 within waveguide 2 is not fully collimated by the $As_2S_3$ lens.

A screen 9 is spaced a suitable distance from the waveguide end face 11 for indicating the width of the end fired light beam 7. The width "A" of the light beam on the screen 9 is wider than the width "B" of the light beam 8 representing a correctly collimated light beam which would be obtained if the as-deposited Luneburg lens 1 had the designed focal length for the lens.

In the second step, in order to obtain the correct focal length of the $As_2S_3$ lens in this situation, external energy radiation, typically light or heat radiation, preferably ultra violet (U.V.) light 10 is directed to illuminate the $As_2S_3$ lens for very short periods of time, or continuously, until the beam width "A" at screen 9 becomes equal to that of the correctly collimated light "B". For precise adjustment of the focal length of the $As_2S_3$ lens, it is preferable to provide a diode sensor array (not shown) instead of screen 9 at that position and to correlate the output of the diode sensor array to a switch for operating the ultra violet light source. With such a construction control of ultra violet light exposure on the $As_2S_3$ lens is automatically performed in accordance with the monitoring of the signals from the sensor array and exposure is terminated when the correct beam width "B" and hence the correct focal length "C" for the $As_2S_3$ Luneburg lens is detected.

The change of the refractive index in evaporated $As_2S_3$ film upon exposure to light will be referred to as the photorefractive effect, defined as a change in index of refraction due to irradiation with light of an appropriate wavelength, and has successfully been used in other fields such as holographic recording material. The quantity of increase in refractive index depends upon the wavelength and total energy of the illuminating light 10 and light of shorter wavelength such as U.V. or blue light is more efficient in causing an increase in refractive index.

The design focal length for the Luneburg lens is selected in accordance with the desired width of the parallel beam and the refractive index of the lens. To provide some leeway in focus adjustment, it is preferable to design the Luneburg lens such than when its index is maximized by exposure to light its focal length is less than the design focal length. Since the as-deposited lens will have a lower index than the design, the actual focal length will thus be greater than the design focal length. Subjection to U.V. light will then reduce the focal length to the design value and will permit further reduction to a minimal focal length at the saturation state, if desired.

Figure 2:
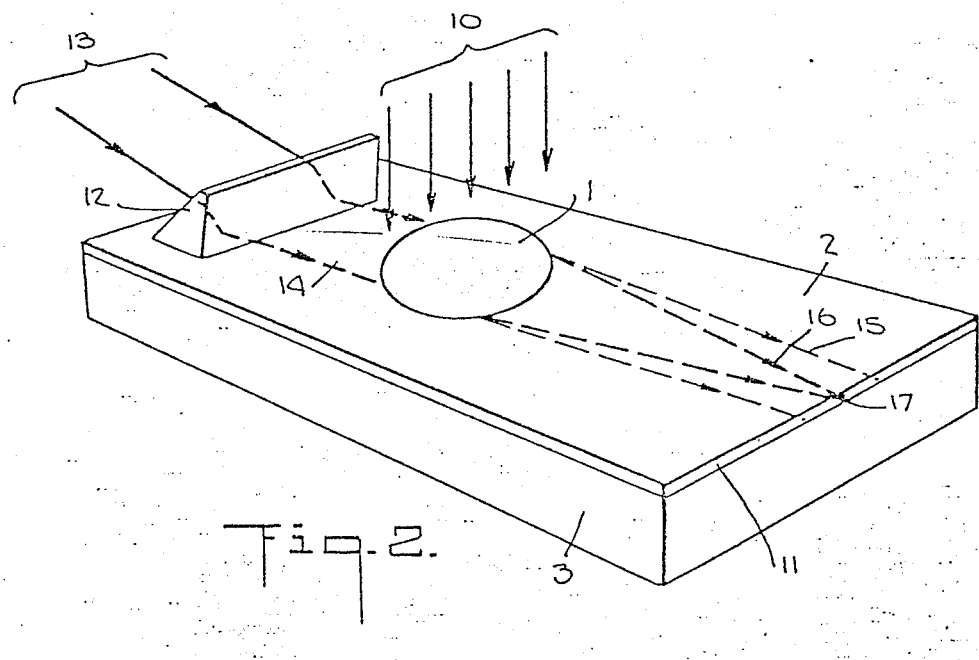
FIG. 2 is a perspective view illustrating an $As_2S_3$ Luneburg lens according to the present invention used as a focusing lens.

FIG. 2 shows a Luneburg lens 1 of $As_2S_3$ material, waveguide 2 and substrate 3 formed similarly as in FIG. 1. As in the embodiment of FIG. 1, the position of the center of the $As_2S_3$ Luneburg lens is located at the design focal length from the end face 11 so that the collimated sheet beam 13 coupled by a rectangular prism 12 is slightly defocused when the $As_2S_3$ is in its low-index, as-deposited condition. The light is monitored at the end face 11 of waveguide 2, by a diode sensor array (not shown).

In order to adjust the focal length of $As_2S_3$ Luneburg lens 1, and to form a correctly focused beam spot 17 at the end face 11 of waveguide 2, external light 10, preferably U.V. light, is provided to repeatedly illuminate $As_2S_3$ lens 1 for very short periods of time as a pulsed light source until the spot size at the end face 11 reaches a minimum by monitoring the output signals from the diode sensor array.

It is also useful to cover the processed $As_2S_3$ lens with a protective coating so that unwanted further change of the refractive index of the $As_2S_3$ does not occur due to accidental exposure to external radiation, particularly U.V. light, or by moisture penetration into the $As_2S_3$ lens from the surrounding atmosphere. For this protective coating, a combination of a low-index film, such as an organic photoresist or other material which may be applied without thermally degrading the lens material, and a high reflecting film of Al, Au or Ag on the low-index film is sufficient to prevent further light-induced refractive index change of the $As_2S_3$ Luneburg lens. The thickness of the low-index film is preferably 1,000 Å and above while the thickness of the reflecting film is preferably 500 Å and above. Such a protected Luneburg lens is disclosed and claimed in copending U.S. application Ser. No. 254,471, filed on Apr. 15, 1981.

EXAMPLE

Two $As_2S_3$ Luneburg lens samples were fabricated by mask deposition from a quartz crucible with $As_2S_3$ fused glass under a high vacuum of $1 \times 10^{-5}$ Torr to have a 8 mm diameter and a center thickness of 0.8 microns on a Y-cut Ti in-diffused $LiNbO_3$ waveguide. The following tables show the results of subjection to Argon laser light and U.V. black light:

| Sample #1 Source: 4880 Å Argon Laser Light | | | |
|---|---|---|---|
| Power density ($mW/cm^2$) | Incremental exposure time (min) | Total energy density ($mJ/cm^2$) | Focal length in $LiNbO_3$ (cm) |
| 1.0 | 0 | 0 | 5.65 |
| 1.0 | 10 | 600 | 4.51 |
| 3.0 | 10 | 2400 | 3.82 |

| Sample #2 Source: Long Wavelength UV Black Light | | | |
|---|---|---|---|
| Power density ($mW/cm^2$) | Incremental exposure time (min) | Total energy density ($mJ/cm^2$) | Focal length in $LiNbO_3$ (cm) |
| 0.1 | 0 | 0 | 12.52 |
| 0.1 | 10 | 60 | 10.46 |
| 0.1 | 5 | 90 | 9.32 |
| 0.1 | 10 | 150 | 8.17 |
| 0.1 | 65 | 540 | 5.42 |

This method is particularly useful in making an optical beam scanner wherein the light beam propagated in the waveguide is deflected by a surface acoustic wave.

Having thus described the invention with particular reference to the preferred forms thereof, it will be obvi- ous to those skilled in the art to which the invention pertains, after understanding the invention, that various changes and modifications may be made therein without departing from the scope of the invention as defined by the claims appended hereto. For example, other materials can be used for the Luneburg lens material such as other chalcogenide glasses.

What is claimed is:

1. A method for forming a Luneburg lens having a predetermined focal length, said method comprising the steps of:

fabricating a Luneburg lens overlay on a waveguide from a photorefractive material; and exposing said fabricated Luneburg lens to energy radiation of a wavelength sufficient to vary the focal length of the Luneburg lens until the focal length thereof is adjusted to the predetermined value.

2. A method according to claim 1, wherein said lens is subjected to U.V. light.

3. A method according to claim 1, wherein said lens material comprises $As_2S_3$.

4. A method according to claim 3, further comprising the step of covering said adjusted Luneburg lens with a protective coating which protects said lens from external radiation.

5. A method according to claim 1, further comprising the step of covering said adjusted Luneburg lens with a protective coating which protects said lens from external radiation.

* * * * *